Patented May 17, 1949

2,470,410

UNITED STATES PATENT OFFICE 2,470,410

PREPARATION OF SILICA MAGNESIA CATALYSTS

Karl J. Nelson, Cranford, N. J., assignor to Standard Oil Development Company, a corporation of Delaware No Drawing. Application April 9, 1946, Serial No. 660,841

5 Claims. (Cl. 252—457)

The present invention relates to improved catalysts for the treatment of petroleum oils. It is more particularly concerned with the preparation of a silica-magnesia catalyst having superior characteristics for the cracking of petroleum oils. In accordance with the present process the improved silica-magnesia catalyst is prepared by aging the catalyst during preparation at elevated temperatures prior to drying.

It is well known in the art that synthetic porous solids, comprising silica and one or more metallic oxides, have catalytic properties for the treatment of mineral oils. In the cracking of these mineral oils the catalytic properties will depend on the metallic oxide or oxides incorporated with the silica, the method of and treatment during incorporation and the quantity or quantities incorporated. For instance, one general classification of synthetic contact masses consists of silica and alumina with or without the addition of a third component such as zirconia or the like. These materials are characterized as those producing relatively large amounts of olefinic and isoparaffinic hydrocarbons having molecular weights from 28 to 56 or higher and capable of producing naphthas in the gasoline boiling range which contain appreciable quantities of mono and polycyclic aromatic hydrocarbons. In general these catalysts are highly desirable for the manufacture of aviation gasolines. Another general classification of synthetic contact masses comprises silica and magnesia as the major oxides with or without the addition of alumina, calcium or the like. In comparison with the first discussed classification the silica-magnesia type catalysts during cracking produce smaller quantities of hydrocarbons having molecular weights below 58, and a substantial increase in hydrocarbons having desirable octane qualities boiling in the range from 100° F. to 450° F. vapor temperature. It is apparent that these catalysts are more suited for refining operations producing high quality motor gasolines providing that the silica-magnesia contact masses can be prepared to possess desirable activity and stability characteristics. My invention deals with a method for gaining such superior characteristics in a commercially desirable manner by aging the catalyst at elevated temperatures prior to drying.

One method of preparing silica-magnesia catalyst is to mull magnesia with washed silica hydrogel and water. The ratio of water to the total solids is usually in the range of 5 to 12 parts by weight of water per part solids. The mulling is usually carried out by suitable means such as in a ball, tube, or rod mill or Simpson mixer or the like. Mulling is conducted over a period of from 5 to 10 hours under conditions to form a very finely divided product which in many cases is a semi-fluid. The material is then slowly dried in a convection type drier operating at a temperature in the range from 180° F. to 275° F. The drying period is from 12 to 48 hours. The dried catalyst is then activated by heating at 1250° F. for 3 hours.

The above procedure although producing a satisfactory catalyst is not commercially desirable. The large amount of equipment for mulling is relatively expensive. Furthermore, the residence time of from 5 to 10 hours requires excessive duplication of these costly facilities with consequent duplication of operating requirements in order to secure sufficient quantity production of the catalyst. For instance, to produce one ton of bone-dry silica-magnesia catalyst containing essentially 67% $SiO_2$ and 33% MgO approximately 2100 gallons of materials must be mulled and dried. In a similar fashion the long-time low temperature drying requires an excessive installation of convection drying equipment.

I have now discovered that providing the silica-magnesia catalyst is aged at elevated temperatures prior to drying unexpected and commercially desirable results are secured.

In accordance with the preferred modification of my invention washed silica hydrogel is mulled with magnesia and water. The ratio of water to solids is in the range from about 5 to 12 parts by weight of water per part of total solids. In general I prefer to use from about 7 to 9, say 8, weight ratio of water to solids.

In accordance with my process the mulling is carried out over a period from about 15 seconds to 20 minutes. In general I prefer that the mulling period be in the range from about 3 to 10 minutes. This is accomplished by any suitable means but preferably by passage of the materials continuously through a ball or tube mill or equivalent, and this treatment may be followed by continuous flow through one or more stages of a colloid mill or equivalent equipment. Another modification is to granulate or pre-size the silica hydrogel and then to mix continuously the silica hydrogel, magnesia and water in an agitator followed by continuous flow through one or more stages of a colloid mill, a Mikro-pulverizer or similar equipment.

The resulting slurry which has been mulled for about 15 seconds to 20 minutes is heated to a temperature above 70° F. and below 212° F., preferably in the range from about 125° F. to 200° F. The slurry is held in this temperature range for a period from about 2 to 12 hours in relatively cheap tank equipment. A very desirable procedure is to hold the slurry at a temperature in the range from about 140° F. to 160° F. for a period from 4 to 6 hours. During this aging period the slurry may become a semi-fluid but peptization follows to yield a product which is pumpable.

Following the aging period the aged slurry is heated to a temperature in the range from about 212° F. to 600° F. to effect drying at a commercially desirable rate. The dried catalyst is then activated by heating 3 hours at 1250° F.

The process of my invention may be widely varied. The process generally comprises aging the mulled slurry at an elevated temperature prior to drying and activation.

The process of my invention may be more readily understood by the several operations in the following example, illustrating some modification of the same.

*Operation A.*—Silica hydrogel, magnesia and water were mulled for 7 hours in a ball mill. The mixture was slowly dried in a convection drier for 24 hours at a temperature in the range from about 225° F. to 250° F. The catalyst was activated by heating at 1250° F. for 3 hours.

*Operation B.*—Catalyst prepared in accordance with operation A except rapid forced convection drying at 225° F. to 250° F. was employed.

*Operation C.*—Silica hydrogel, magnesia and water were mulled 5 minutes in a ball mill followed by passage once-through a colloid mill. This mixture was aged for 5 hours at 70° F. It was then dried at 225° F. to 250° F. with rapid forced convection drying. The dried catalyst was activated by heating for 3 hours at 1250° F.

*Operation D.*—Identical to operation C except that the mulled slurry was aged 5 hours at 150° F. rather than 5 hours at 70° F.

*Operation E.*—Same as operation C except that the mulled slurry was aged 5 hours at 200° F. rather than 5 hours at 70° F.

*Operation F.*—Silica hydrogel was pre-sized to pass through a 12 mesh screen. The hydrogel was then agitated with magnesia and water and passed once-through a colloid mill. The slurry was then aged for 5 hours at 150° F. The aged slurry was then dried at 225° F. to 250° F. by rapid forced convection drying and activated by heating at 1250° F. for 3 hours.

The silica-magnesia catalysts prepared by the above procedures were contacted under identical cracking conditions with East Texas virgin gas oil having a boiling range from about 500° F. to 700° F. The initial activity of these materials as measured by the distillate to 400° F. and loss is shown in column I. The qualities of the materials after subjection to the accelerated steaming conditions of 24 hours' treatment with 60 p. s. i. g. steam at 1050° F., and then subjected to the cracking conditions outlined above appear in column II. This test is particularly significant in demonstrating the stability characteristics of cracking catalysts.

| Oper. | Description | Column I D+L Act. 3 hrs. at 1250° F. | Column II D+L After steaming 24 hrs. 1050° F. 60 p. s. i. g. |
|---|---|---|---|
| A | SiO₂ Hydrogel MgO and H₂O mulled 7 hrs. in ball mill, slow conv. drying 24 hrs. at 225-250° F. | 54 | 44.5 |
| B | Same as above—rapid forced conv. drying. | 46 | 35 |
| C | SiO₂ Hydrogel, MgO and H₂O mulled 5 min. in ball mill followed by passage, once through colloid mill, aged 5 hrs. at room temp. (70° F.), rapid forced conv. drying. | 49 | 37 |
| D | Same as above only aged 5 hrs. at 150° F. | 53 | 44 |
| E | Same as above only aged 5 hrs. at 200° F. | 49 | 38 |
| F | SiO₂ Hydrogel pre-sized to 12 mesh size, agitation with MgO and H₂O, followed by passage, once through colloid mill, aged 5 hrs. at 150° F., rapid forced conv. drying. | 61 | 48.5 |

The catalyst prepared according to operation A has very desirable catalytic and stability characteristics but the preparation technique is commercially undesirable. In addition the material is very sensitive to drying conditions as shown by operation B wherein the use of rapid forced convection drying appreciably lowered the initial activity and stability.

The catalysts from operations C, D, E and F, all using modifications of my invention, all show improved properties over the catalyst prepared in operation B. It is also evident that the catalysts from operations D and F, employing the preferred embodiment of my invention, produce highly efficient catalysts by commercially desirable methods. These catalysts are equal or superior to the material produced in operation A.

My invention may be adapted not only for the preparation of a silica-magnesia catalyst prepared by mulling or mixing techniques, but may also be applied to catalysts which are prepared by impregnation techniques. For example, an excellent catalyst may be prepared by impregnating washed silica hydrogel with soluble magnesium salts followed by precipitation of the hydrate and then washing out all the residual salts. After the second washing step, the impregnated hydrogel is aged at 150° F. for a period from 2 to 12 hours. If a catalyst is prepared as described, the initial activity is increased from 40–45 to 50–55 D+L and the steam stability from 30–37 to 42–46 D+L.

The silica-magnesia catalyst may vary widely. In general, the amount of silica varies from about 50% to 95% by weight as compared to 50% to 5% magnesia by weight. For example, one catalyst comprises about 67% silica and 33% MgO. Although the catalyst is generally dried at a temperature in the range from about 225° F. to 600° F., it is to be understood that the catalyst may be dried from about 212° F. and above.

The process of my invention is not to be limited by any theory as to mode of operation, but only in and by the following claims in which it is desired to claim all novelty insofar as the prior art permits.

I claim:

1. Process for the preparation of an improved silica-magnesia catalyst which comprises mulling a water suspension of silica hydrogel and magnesia, for a period of from 15 seconds to 20 minutes to form a slurry, aging the slurry at a temperature from about 125° F. to 200° F. for a period of about 2 to 12 hours, drying the slurry at a temperature in the range from about 225° F. to 600° F.

2. Process in accordance with claim 1 in which said slurry is aged at a temperature in the range from about 140° F. to 160° F. for a period from about 4 to 6 hours.

3. Improved process for the preparation of a silica-magnesia catalyst which comprises preparing a water suspension of silica hydrogel and magnesia, mulling said suspension for a period of from 15 seconds to 20 minutes to form a slurry, aging said slurry at a temperature in the range from 125° F. to 200° F. for a period from about 2 to 12 hours, drying the slurry at a temperature in the range from about 225° F. to 600° F., followed by activating the dried catalyst at a temperature at 1250° F. for about 3 hours.

4. Process in accordance with claim 3 in which the amount of water employed in the mulling operation is about 5 to 12 parts by weight of water per part of solid material.

5. Improved process for the preparation of a silica-magnesia catalyst which comprises presizing the silica hydrogel, mixing said presized silica hydrogel with magnesia and water in an agitator, mulling this mixture for about 15 seconds to 20 minutes to form a slurry, aging the slurry at a temperature in the range from 125° F. to 200° F. for a period of from 2 to 12 hours, drying the slurry at a temperature in the range from about 212° F. to 600° F.

KARL J. NELSON.

REFERENCES CITED

The following references are of record in the file of this patent:

UNITED STATES PATENTS

| Number | Name | Date |
| --- | --- | --- |
| 1,772,055 | Miller et al. | Aug. 5, 1930 |
| 1,900,859 | Connolly et al. | Mar. 7, 1933 |
| 2,326,523 | Connolly et al. | Aug. 10, 1943 |
| 2,340,698 | Ruthruff | Feb. 1, 1944 |
| 2,343,295 | Bailie et al. | Mar. 7, 1944 |
| 2,343,731 | Bailie et al. | Mar. 7, 1944 |
| 2,363,832 | Connolly | Nov. 28, 1944 |
| 2,390,556 | Ruthruff | Dec. 11, 1945 |
| 2,412,958 | Bates | Dec. 24, 1946 |
| 2,343,634 | Thomas | Dec. 16, 1947 |